United States Patent
Rieper et al.

Patent Number: 5,266,110
Date of Patent: Nov. 30, 1993

[54] CRYSTAL MODIFICATION OF C.I. PIGMENT YELLOW 16

[75] Inventors: Wolfgang Rieper, Frankfurt am Main; Edwin Baier, Kelkheim, both of Fed. Rep. of Germany

[73] Assignee: Hoechst Aktiengesellschaft, Frankfurt, Fed. Rep. of Germany

[21] Appl. No.: 968,487

[22] Filed: Oct. 29, 1992

[51] Int. Cl.$^5$ .......................................... C09B 33/153
[52] U.S. Cl. ..................... 106/496; 106/493; 106/494; 534/746; 534/748
[58] Field of Search ................. 106/496; 534/746, 748

[56] References Cited

U.S. PATENT DOCUMENTS 4,048,152 9/1977 Ribka et al. .................... 106/496

FOREIGN PATENT DOCUMENTS 386054 12/1923 Fed. Rep. of Germany .

Primary Examiner—Mark L. Bell
Assistant Examiner—Scott L. Hertzog
Attorney, Agent, or Firm—Connolly and Hutz

[57] ABSTRACT

The invention relates to three new crystal modifications ($\gamma$, $\delta$, $\epsilon$ modification) of C.I. Pigment Yellow 16

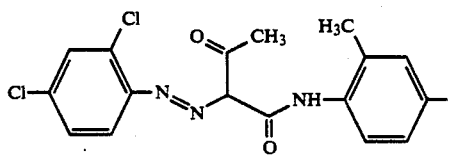

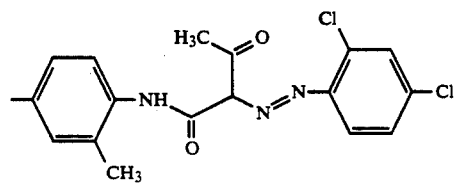

having their characteristic reflections in the X-ray diffraction spectrum.

The new crystal modifications are prepared by heat treatment of the known $\alpha$ or $\beta$ modification in selected organic solvents.

14 Claims, 5 Drawing Sheets

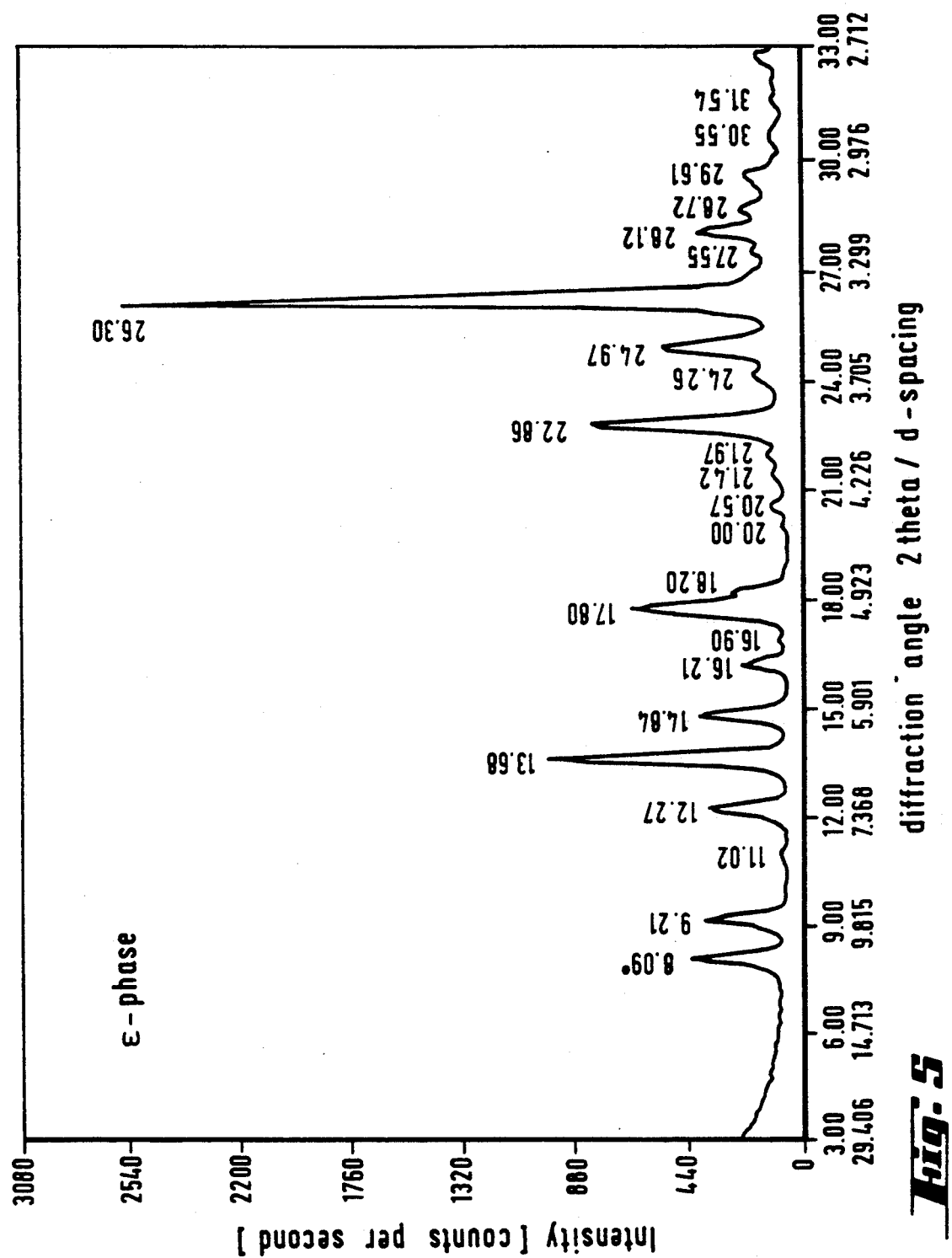

CRYSTAL MODIFICATION OF C.I. PIGMENT YELLOW 16

The invention relates to three new crystallographic modifications (γ, δ, ε modification) of the disazo pigment C.I. Pigment Yellow 16 (C.I. No. 20040, CAS No. 5979-28-2) having the constitution:

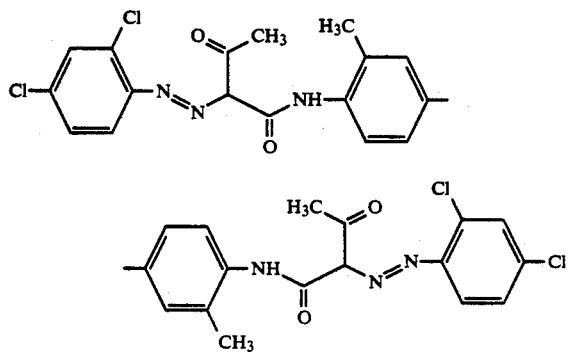

Of the already commercially existing pigment forms, two crystallographic modifications (α and β modification) are known, which, however, are not designated as such in the relevant literature.

The yellow pigment obtained by coupling of two equivalents of diazotized 2,4-dichloroaniline onto one equivalent of the bifunctional coupling component 3,3'-dimethyl-4,4'-(bisacetoacetyl)diaminodiphenyl (German Patent 386,054 analogously to Example 1 or FIAT Report 1313, pp. 473-475) is the α modification, while the β modification is obtained by thermal aftertreatment of the coupling product at temperatures above 100° C., for example in the presence of isobutanol (U.S. Pat. No. 4,048,152, Example 2).

In their X-ray diffraction pattern obtained by Cu Kα radiation, these two modifications have characteristic reflections at the following diffraction angles $2\theta$ (precision ±0.05°):

α modification (FIG. 1)
High-intensity maximum at 25.91°;
Medium-intensity maxima at 12.75°, 16.76° and 25.15°;
Low-intensity maxima at 9.5°, 11.06°, 18.69°, 19.33°, 21.67° and 31.31°.

β modification (FIG. 2)
High-intensity maximum at 26.38°;
Medium-intensity maxima at 13.09°, 17.0° and 22.11°;
Low-intensity maxima at 9.05°, 9.30°, 12.61°, 18.39°, 23.17°, 23.92°, 24.28°, 25.12°, 28.35° and 28.55°.

Division of the reflections into those of high, medium or low intensity refers to the measurement of the relative intensities of X-ray powder patterns of the pigment using a scintillation counter as the detector, these intensities at the particular maximum being based on the highest maximum (=100 %). Values of between 100 and about 50% are defined as high-intensity, those of between about 50 and 20% as medium-intensity and relative values of between about 20 and 5% as low-intensity reflections. Values of lower relative intensities are not included.

Surprisingly, three new crystallographic modifications (γ, δ, ε modification) of C.I. Pigment Yellow 16 have now been found, which modifications can have the following characteristic reflections ($2\theta$) in their X-ray diffraction patterns, the intensities given being based again on relative values of X-ray powder patterns of the pigment samples:

γ modification (FIG. 3)
High-intensity maximum at 25.90°;
Medium-intensity maxima at 13.57°, 17.10° and 23.27°;
Low-intensity maxima at 9.28°, 12.15°, 14.92°, 16.1120, 21.79°, 24.11°, 24.94°, 28.16° and 28.83°.

δ modification (FIG. 4)
High-intensity maximum at 26.40°;
Medium-intensity maxima at 13.39°, 17.27° and 22.46°;
Low-intensity maxima at 7.71°, 9.19°, 12.43°, 14.71°, 15.51°, 17.80°, 25.09°, 28.09° and 28.69°.

ε modification (FIG. 5)
High-intensity maximum at 26.30°;
Medium-intensity maxima at 13.68°, 17.80° and 22.86°;
Low-intensity maxima at 8.09°, 9.21°, 12.27°, 14.84°, 16.21°, 18.20°, 24.97° and 28.12°.

The new pigment modifications according to the invention show coloristic variations, for example compared with the known β modification, which in some cases are considerable: The γ modification is greener, the δ modification is substantially redder, and the ε modification is somewhat redder and purer.

Moreover, the δ and ε modifications are distinguished by improved light fastness properties compared with the α and β modifications.

Advantageously, the crystal modifications according to the invention are obtained starting with the α modification, i.e. the untreated coupling product C.I. Pigment Yellow 16, by thermal aftertreatment in selected organic solvents. The crystal modifications according to the invention can also be obtained in the same manner starting from the β modification or a mixture of α and β modifications.

The γ modification is produced by treatment of the dry pulverulent pigment of the α modification with at least one solvent from the class of $C_1$-$C_4$-alkylbenzenes or halogenated benzenes, for example toluene, xylene, chlorobenzene or 1,2-dichlorobenzene, or mixtures thereof at temperatures above 60° C., preferably above 80° C., in particular above 100° C. The upper limit of the treatment temperature is advantageously the boiling point of the particular solvent at atmospheric pressure, although it is also possible to work at higher pressure and correspondingly higher temperature.

The δ modification can be obtained by a treatment of the α form in N-methylpyrrolidone at temperatures of between 50° and 150° C., preferably 60° and 80° C., while conversion into the ε modification takes place in a solvent treatment of the α or β modification or a mixture of both modifications in methyl ethyl ketone at temperatures of between 30° and 80° C., preferably 60° and 80° C.

The duration of the treatment depends on the treatment temperature but should not be less than 15 minutes. Although treatment times of more than 3 hours are possible, they are not advantageous for economic reasons.

Some of the new modifications according to the invention as well as the already known β modification of Pigment Yellow 16 can be converted into one another, in some cases also reversibly.

Thus, for example, thermal treatment of a sample of the γ modification in dimethylformamide gives the β modification and, vice versa, chlorobenzene treatment of the β phase gives again the γ modification. The ε modification can also be converted into the γ modification using chlorobenzene. However, if dimethylformamide is used for the thermal treatment of the δ phase, the β modification is again formed.

The pigment forms according to the invention are suitable for the pigmenting of printing inks, varnishes, plastics and aqueous pigment preparations. Owing to the higher stability of the ε crystal modification compared with the remaining phases, this modification is suitable in particular for the pigmenting of, for example, printing inks and varnishes, since in this case a coloristic change caused by phase transition in the application medium can be ruled out.

BRIEF DESCRIPTION OF THE DRAWINGS

FIG. 5 shows the X-ray diffraction pattern of the new ε modification.

Figure 1:
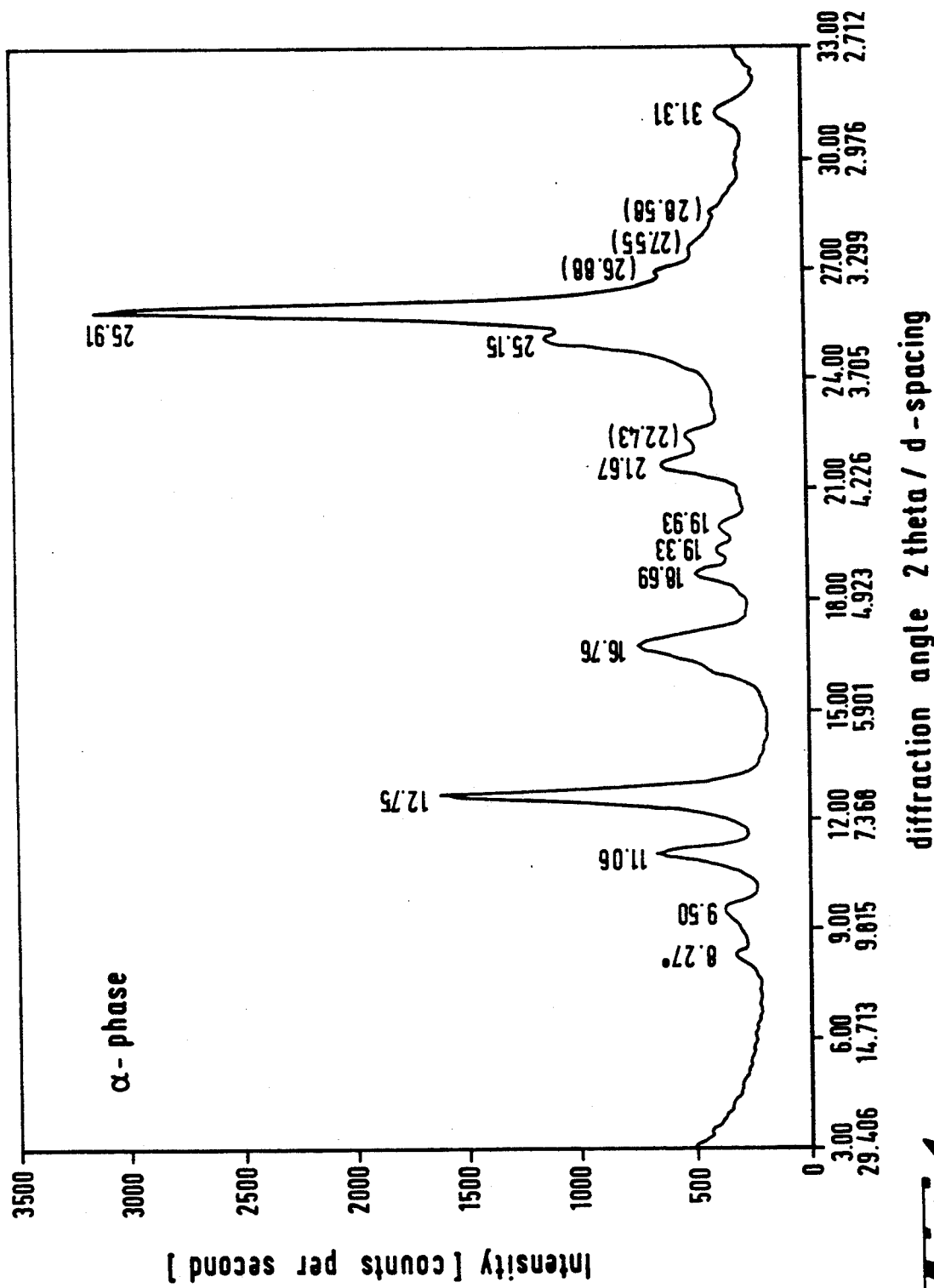
FIG. 1 shows the X-ray diffraction pattern of the prior art α modification.
Figure 2:
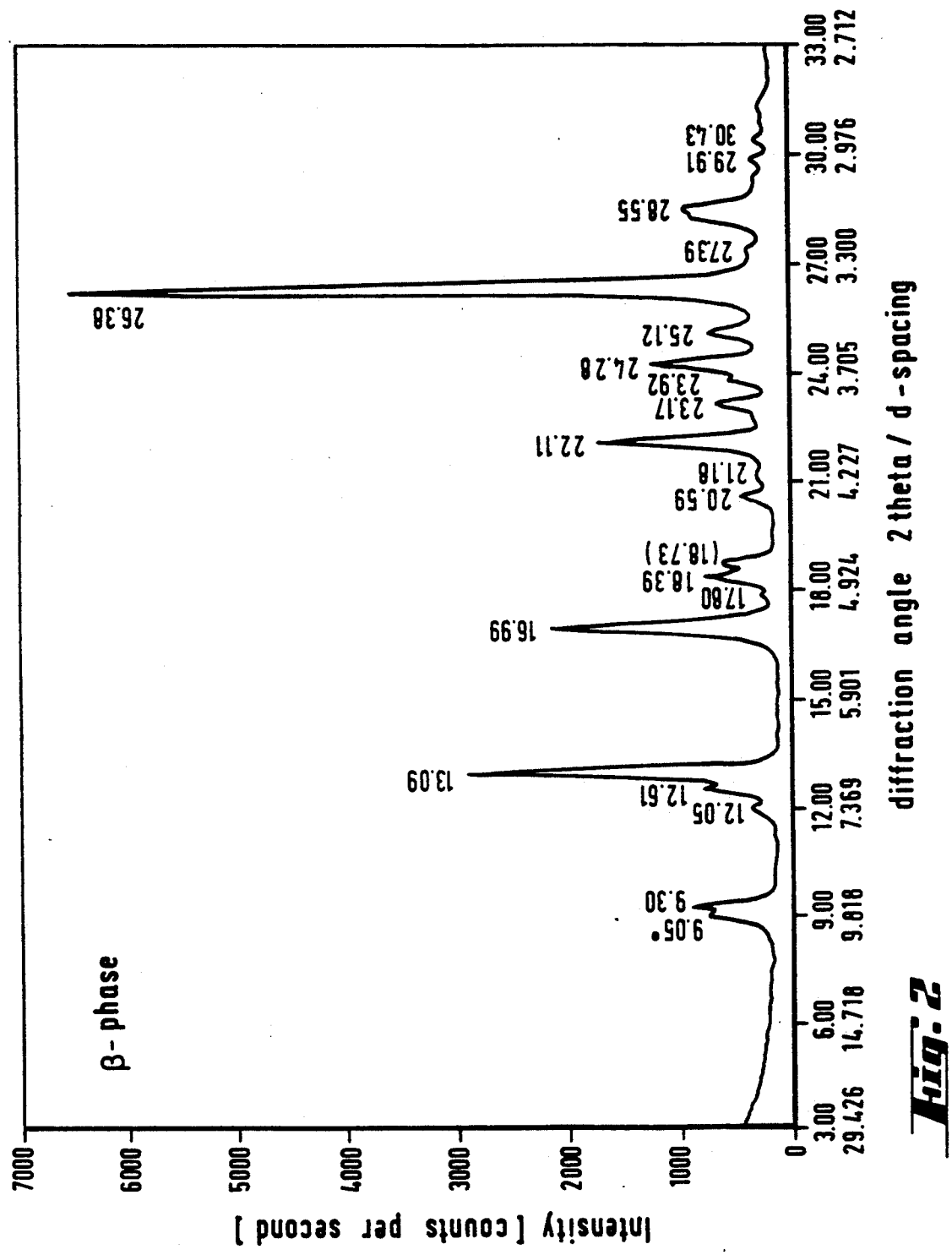
FIG. 2 shows the X-ray diffraction pattern of the prior art β modification.
Figure 3:
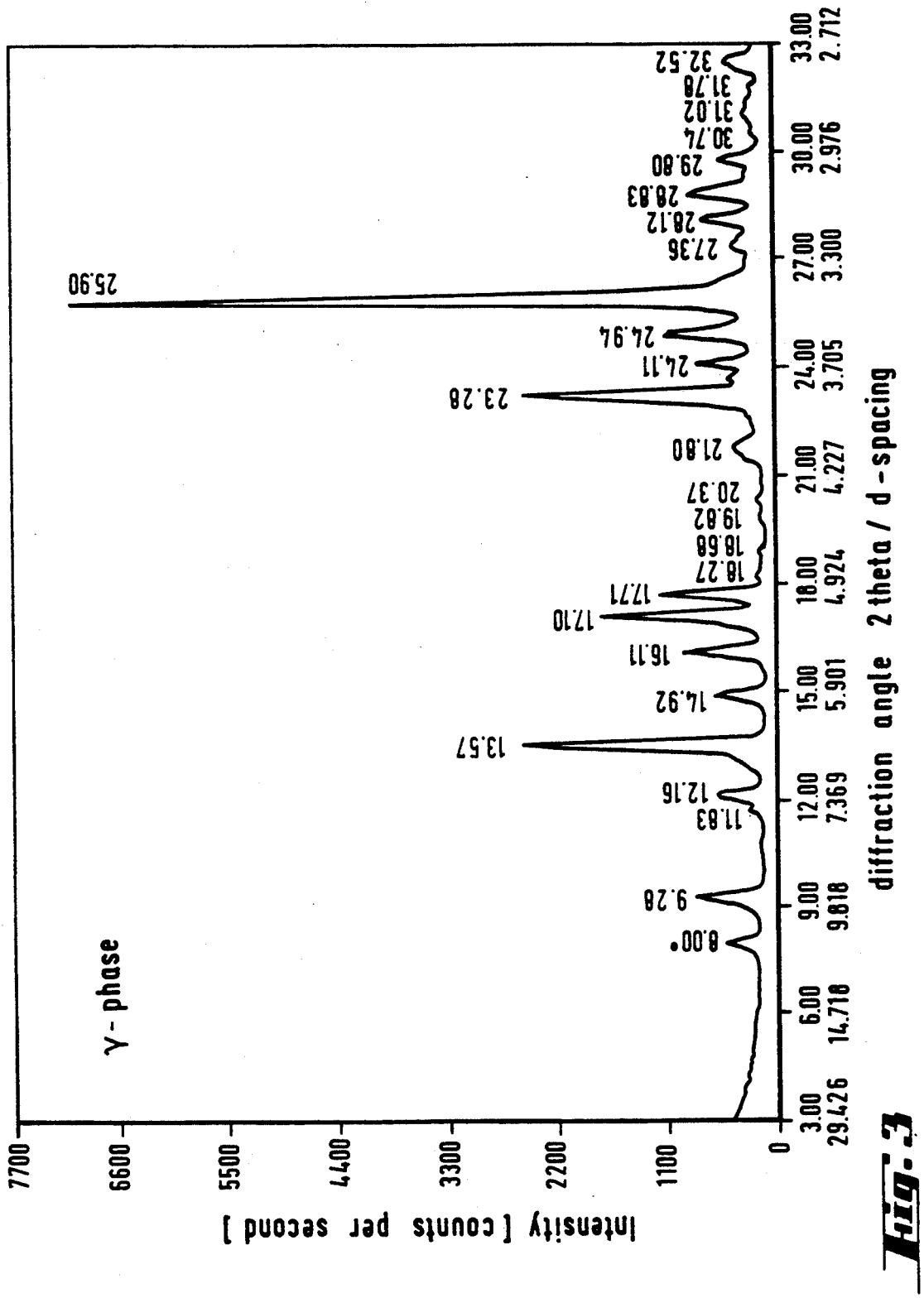
FIG. 3 shows the X-ray diffraction pattern of the new γ modification.
Figure 4:
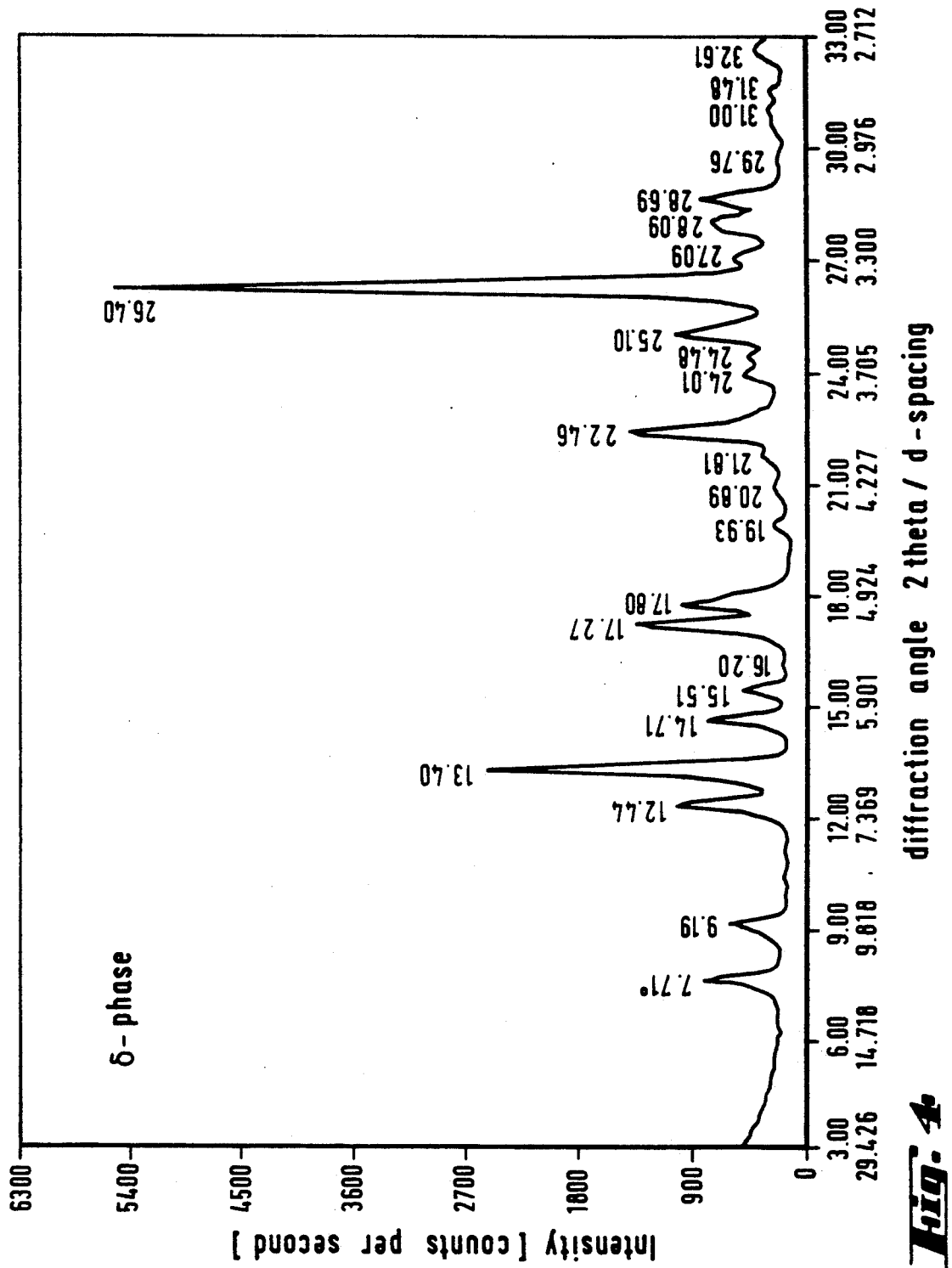
FIG. 4 shows the X-ray diffraction pattern of the new δ modification.

In the examples which follow, parts are by weight.

EXAMPLES 1) 10 parts of the C.I. Pigment Yellow 16 (α modification) obtained in the above mentioned manner after coupling of two equivalents of diazotized 2,4-dichloroaniline onto one equivalent of 3,3'-dimethyl-4,4'-(bisacetoacetyl)diaminodiphenyl were introduced in pulverulent form into 100 parts of chlorobenzene, the suspension was heated to 125° C. with stirring and treated at this temperature for two hours. After cooling to about 30° C., the mixture was filtered, the pigment washed with methanol and then dried and milled. In the X-ray diffraction spectrum, the pigment thus obtained exhibited the reflections characteristic of the γ crystal modification.

2) 10 parts of the α modification of C.I. Pigment Yellow 16 obtained in the usual manner were treated in 100 parts of N-methylpyrrolidone at 60° to 80° C. for 45 minutes with stirring. The extremely reddish yellow pigment obtained after filtration, washing and drying was identified by its X-ray diffraction spectrum as the α modification.

3) 10 parts of the α modification of C.I. Pigment Yellow 16 were introduced into 100 parts of methyl ethyl ketone and stirred at 60° to 65° C. for twenty minutes. The mixture was then filtered, the pigment was washed with methanol, dried and milled. According to the characteristic reflections in the X-ray diffraction spectrum, the pigment isolated after this treatment was present in the ε modification.

4) The procedure of Example 3 was repeated, except that the β modification of the pigment was reacted in methyl ethyl ketone, also giving the ε modification of C.I. Pigment Yellow 16.

5) 10 parts of the γ modification obtained according to Example 1 were subjected to a thermal treatment at 90° to 100° C. in 100 parts of dimethylformamide for thirty minutes. After isolation, this gave a conversion product which was identified by its reflections in the X-ray diffraction spectrum as the β modification.

6) If, analogously to Example 5, the δ modification obtained according to Example 2 is subjected to a thermal treatment in dimethylformamide, its conversion into the β crystal modification of C.I. Pigment Yellow 16 can also be effected.

7) 10 parts of the δ modification obtained according to Example 2 were suspended in 100 parts of chlorobenzene, and the suspension was heated at 100° to 105° C. for one hour. This resulted in a substantial color change from reddish yellow to medium yellow. The isolated pigment was identified by its X-ray diffraction spectrum as the γ phase of C.I. Pigment Yellow 16.

We claim:

1. A crystal modification of C.I. Pigment Yellow 16 (γ modification) having characteristic reflections at the following diffraction angles 2 θ in the X-ray diffraction pattern:

High-intensity maximum at 25.90°;

Medium-intensity maxima at 13.57°, 17.10° and 23.27°;

Low-intensity maxima at 9.28°, 12.16°, 14.92°, 16.11°, 21.79°, 24.11°, 24.94°, 28.16° and 28.83°.

2. A crystal modification of C.I. Pigment Yellow 16 (δ modification) having characteristic reflections at the following diffraction angles 2 θ in the X-ray diffraction pattern:

High-intensity maximum at 26.40°;

Medium-intensity maxima at 13.39°, 17.27° and 22.46°;

Low-intensity maxima at 7.71°, 9.19°, 12.43°, 14.71°, 15.51°, 17.80°, 25.09°, 28.09° and 28.69°.

3. A crystal modification of C.I. Pigment Yellow 16 (ε modification) having characteristic reflections at the following diffraction angles 2 θ in the X-ray diffraction pattern:

High-intensity maximum at 26.30°;

Medium-intensity maxima at 13.68°, 17.80° and 22.86°;

Low-intensity maxima at 8.09°, 9.21°, 12.27°, 14.84°, 16.21°, 18.20°, 24.97° and 28.12°.

4. A process for the preparation of the γ crystal modification of C.I. Pigment Yellow 16 as claimed in claim 1, which comprises heating C.I. Pigment Yellow 16 in the α or β modification or a mixture of both modifications in the presence of at least one solvent from the class comprising $C_1$–$C_4$-alkylbenzenes or halogenated benzenes to a temperature above 60° C.

5. The process as claimed in claim 4, wherein the solvent is chlorobenzene or toluene.

6. The process as claimed in claim 4, wherein the mixture is heated to a temperature above 80° C.

7. The process as claimed in claim 4, wherein the mixture is heated to a temperature above 100° C.

8. A process for the preparation of the δ crystal modification of C.I. Pigment Yellow 16 as claimed in claim 2, which comprises heating C.I. Pigment Yellow 16 in the α or β modification or in a mixture of both modifications in the presence of N-methyl-pyrrolidone to a temperature of between 50° and 150° C.

9. A process for the preparation of the δ crystal modification of C.I. Pigment Yellow 16 as claimed in claim 2, which comprises heating C.I. Pigment Yellow 16 in the α or β modification or in a mixture of both modifications in the presence of N-methyl-pyrrolidone to a temperature of between 60° and 80° C.

10. A process for the preparation of the ε crystal modification of C.I. Pigment Yellow 16 as claimed in claim 3, which comprises heating C.I. Pigment Yellow 16 in the α or β modification or in a mixture of both modifications in the presence of methyl ethyl ketone to a temperature of between 30° and 80° C.

11. A process for the preparation of the ε crystal modification of C.I. Pigment Yellow 16 as claimed in claim 3, which comprises heating C.I. Pigment Yellow 16 in the α or β modification or in a mixture of both modifications in the presence of methyl ethyl ketone to a temperature of between 60° to 80° C.

12. Method of pigmenting printing inks, varnished, plastics and aqueous pigment preparations by applying C.I. Pigment Yellow 16 γ modification) as claimed in claim 1 to the printing inks, varnishes, plastics and aqueous pigment preparations to be pigments.

13. Method of pigmenting printing inks, varnishes, plastics and aqueous pigment preparations by applying C.I. Pigment Yellow 16 (δ modification) as claimed in claim 2 to the printing inks, varnishes, plastics and aqueous pigment preparations to be pigmented.

14. Method of pigmenting printing inks, varnishes, plastics and aqueous pigment preparations by applying C.I. Pigment Yellow 16 (ε modification) as claimed in claim 3 to the printing inks, varnishes, plastics and aqueous pigment preparations to be pigmented.

* * * * *